United States Patent [19]
Hashimoto et al.

[11] Patent Number: 4,762,221
[45] Date of Patent: Aug. 9, 1988

[54] TUBULAR BELT CONVEYOR

[75] Inventors: Kunio Hashimoto; Haruo Okazaki, both of Kitakyushu, Japan

[73] Assignee: Bridgestone Corporation, Tokyo, Japan

[21] Appl. No.: 104,286

[22] Filed: Oct. 5, 1987

[30] Foreign Application Priority Data

Oct. 8, 1986 [JP] Japan .................... 61-237996

[51] Int. Cl.$^4$ ........................... B65G 15/08
[52] U.S. Cl. .................... 198/819
[58] Field of Search ........................ 198/819

[56] References Cited

U.S. PATENT DOCUMENTS 3,338,383 8/1967 Hashimoto ............ 198/819
4,402,395 9/1983 Hashimoto ............ 198/819 X Primary Examiner—Robert J. Spar
Assistant Examiner—D. Glenn Dayoan
Attorney, Agent, or Firm—Zarley, McKee, Thomte, Voorhees & Sease

[57] ABSTRACT

A tubular belt conveyor can convey powdered or granular material without leakage continuously. The belt conveyor comprises a forward path and a return path and is opened into flattened shapes which are wound around a driving and a follower roller at both ends. The forward and return paths are on the same vertical plane in the vicinity of the driving and follower rollers and are in the same substantially horizontal plane therebetween so as to simplify foundation, maintenance and inspection.

5 Claims, 4 Drawing Sheets

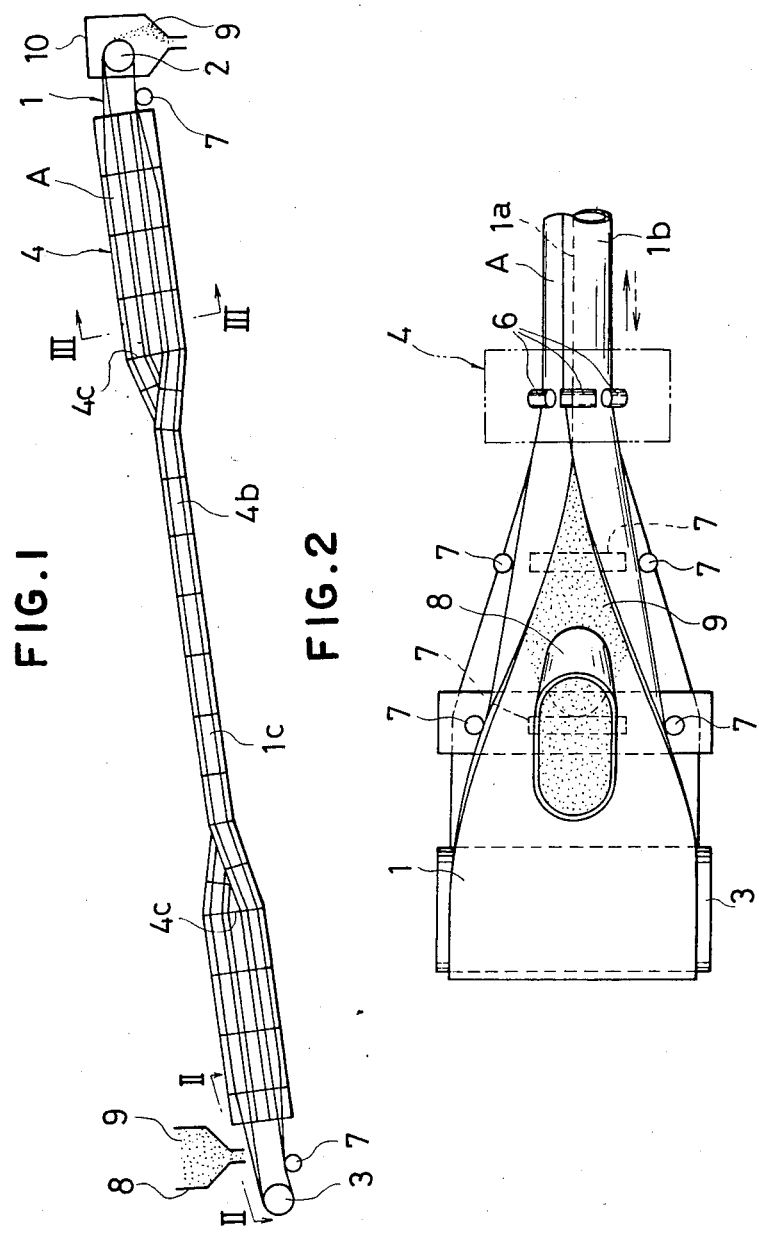

TUBULAR BELT CONVEYOR

BACKGROUND OF THE INVENTION

The present invention relates to a tubular belt conveyor and more particularly to a tubular belt conveyor in which forward and return paths are on the same plane at least partially of the longitudinal direction of the belt to reduce its height.

Usually, such a flattened belt conveyor is rolled up into a tubular shape by overlapping the side ends with each other in the vicinity of a follower roller, goes away towards a driving roller as a forward path to be opened into a flattened shape and is rolled up again to come back to the follower roller as a return path. Powdered or granular material which is thrown from a hopper is wrapped in the endless tubular belt and is conveyed along the forward path, while an empty belt comes back along the return path.

In the conventional tubular belt conveyor as mentioned above, the forward and return paths are overlapped and the tubular portion having a larger diameter requires scaffolds and walking floors for maintenance or inspection, which involves a high cost. The tubular belt conveyor also requires a large height tunnel to pass through.

SUMMARY OF THE INVENTION

It is therefore an object to provide a tubular belt conveyor which is easy and less expensive in maintenance and inspection.

According to the present invention, there is provided a tubular belt conveyor which comprises an endless belt which is rolled up into a tubular shape to run as a forward path for conveying powdered or granular material wrapped therein, a driving roller provided at the terminating end of the forward path for driving the belt so that the belt which is flattened may be wound around the driving roller and may be rolled up again to run as a return path, a follower roller provided at the terminating end of the return path so that the belt may circulate between said two rollers, and a plurality of support frames comprising two chambers through which the forward and return paths pass respectively, each chamber having a plurality of support rollers for supporting the tubular belt;

the improvement comprising that the first and return paths are overlapped in the vicinity of the driving and follower rollers and are on the same plane therebetween.

BRIEF DESCRIPTION OF DRAWINGS

These and other objects as well as advantages of the present invention will become clear by the following description of preferred embodiments of the present invention with reference to the accompanying drawings, wherein:

FIG. 1 is a schematic side view illustrating one embodiment of a tubular belt conveyer acccording to the present invention;

FIG. 2 is an enlarged sectional view taken along line II—II in FIG. 1;

PREFERRED EMBODIMENTS OF THE INVENTION

Figure 3:
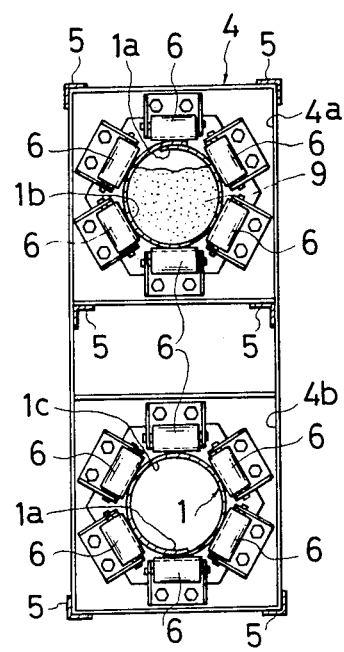
FIG. 3 is an enlarged sectional view taken along line III—III in FIG. 1.

The numeral 1 indicates a flexible endless belt in a tubular shape used as conveying means, which is made of rubber or soft synthetic resin and can be rolled up around a longitudinal axis with its elasticity by overlapping the side ends 1a and 1b with each other. As shown in FIG. 1, the endless belt 1 is opened into a flattened shape in the vicinity of an upper driving roller 2 and a lower follower roller 3 and is wound around the two rollers 2 and 3 to form a conveying path A.

A support frame 4 supports the endless belt 1 at certain intervals to guide it and is connected by a plurality of longitudinal coupling rods 5. The support frame 4 in the vicinity of the driving roller 2 and the follower roller 3 comprises two chambers which are an upper chamber 4a and a lower chamber 4b.

The forward path 1b which is an upper running part of the tubular belt passes through the upper chamber 4a, while the return path 1c which is a lower running part of the tubular belt passes through the lower chamber 4b.

The forward and return paths 1b and 1c are supported by a plurality of belt shape maintaining rollers 6 which are provided in the upper and lower chambers 4a and 4b of each support frame 4.

Figure 4:
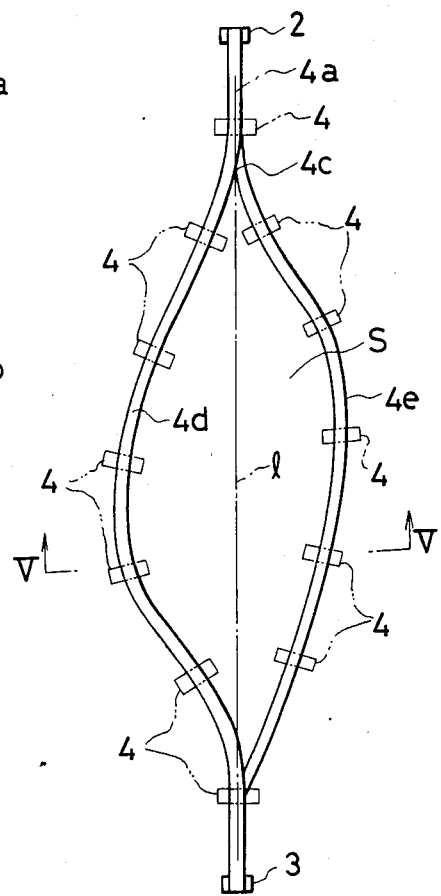
FIG. 4 is a schematic plan view of FIG. 1.
Figure 5:
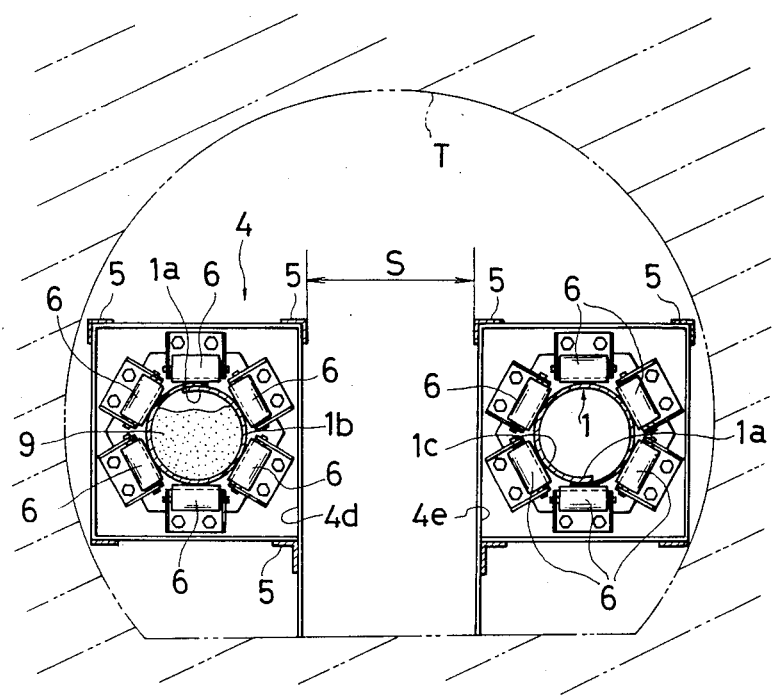
FIG. 5 is a transverse sectional view taken along line V—V in FIG. 4.

As shown in FIG. 4, the carrier way is divided into two paths extending horizontally from a branching point 4c. The upper chamber 4a and the lower chamber 4b are corresponding to a left chamber 4d and a right chamber 4e spaced at a distance S and having a center line therebetween. FIG. 5 shows that the right and left chambers 4d and 4e are located horizontally. As shown in FIG. 2, the endless belt 1 which rotates around the follower roller 3 to come back is supported by the support rollers 7 at the bottom and both sides and is rolled up gradually into a trough, while material to be conveyed such as powdered or granular material 9 is thrown from a hopper 8 which is disposed over the follower roller 3.

Then, the endless belt 1 gets into the upper chamber 4a of the support frame 4, is rolled up onto a tubular shape to form an overlapped portion at the upper end by the belt shape maintaining rollers 6 and goes away, the tubular belt 1 being supported by the belt shape maintaining rollers 6 at the circumference. In the vicinity of the driving roller 2, there is a receiver 10 onto which the powdered or granular material 9 conveyed by the foward path is discharged. The endless belt 1 which is travelled around the driving roller 2 is formed to a tubular part 1c with overlapping portion at the bottom to run towards the follower roller 3 without containing anything.

Figure 6:
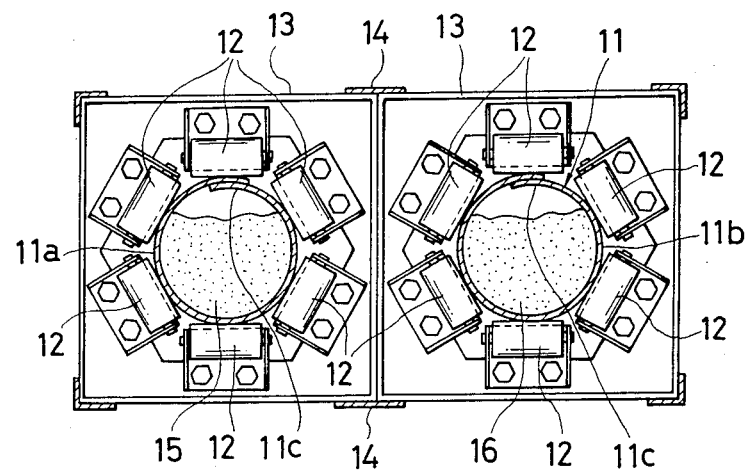
FIG. 6 is a transverse sectional view of another embodiment.

FIG. 6 illustrates another embodiment of the present invention in which support frames 13 including belt shape maintaining rollers 12 are connected transversely by connecting plates 14 and an overlapped portion 11c of the endless belt 11 is positioned at the upper end in the return path 11b, whereby first material 15 is transferable not only in the forward path 11a, but also second material 16 is transferable in the return path 11b. In order to position the overlapped portion 11c at the upper end of the return path 11b, the endless belt 11 is twisted at 180° around a longitudinal axis along the forward path, or turns over so that the inner surface of the forward path may become the outer surface of the return path.

Figure 7:
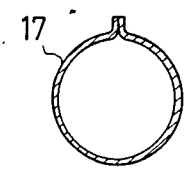
FIG. 7 is a transverse sectional view of further embodiment according to the present invention.

The foregoing embodiments relate to a tubular belt conveyor in which the belt is rolled up by overlapping the inner surface of one side end on the outer surface of the other side end, but the present invention is also applicable to a tubular belt conveyor in which a belt is rolled up by contacting the inner surfaces of side ends with each other to form an upward projection as illustrated in FIG. 7 or by contacting the side edges with each other or getting them close.

As mentioned above, the forward and return paths in the tubular belt conveyor according to the present invention are arranged horizontally, whereby the conveyor is half the height of the conventional conveyor to simplify the foundation, maintenance and inspection. Particularly, when the conveyor is founded in a tunnel, the forward and return paths can be located along right and left walls of the tunnel to decrease the transverse sectional area of the support frame and to assure a passage for maintenance.

It is to be understood that the foregoing relates to only preferred embodiments of the present invention and that various changes and modification may be made by person skilled in the art without departing from the spirit and scope as set out in the following claims.

What is claimed is:

1. A tubular belt conveyor which comprises:
    an endless belt which is rolled up into a tubular shape to run as a forward path for conveying powdered or granular material wrapped therein;
    a driving roller provided at the terminating end of the forward path for driving the belt so that the belt which is flattened may be wound around the driving roller and may be rolled up again to run as a return path;
    a follower roller provided at the terminating end of the return path so that the belt may circulate between said two rollers; and
    a plurality of support frames comprising two chambers through which the forward and return paths pass respectively, each chamber having a plurality of support rollers for supporting the tubular belt; the improvement comprising that
    the first and return paths are on the same substantially vertical plane the vicinity of the driving and follower rollers and are in the same substantially horizontal plane therebetween.

2. A tubular belt conveyor as defined in claim 1 wherein the forward and return paths which are in the same substantially horizontal plane are spaced with each other.

3. A tubular belt conveyor as defined in claim 1 wherein the forward and return paths which are in the same substantialy horizontal plane are connected by connecting means with each other.

4. A tubular belt conveyor as defined in any one of the preceding claims wherein the side ends of the tubular belt are overlapped with each other along the length of the tubular belt.

5. A tubular belt conveyor as defined in any one of claims 1 to 3 wherein the inner surfaces of the side ends in the tubular belt contacts each other to form a projection along the length of the belt.

* * * * *

UNITED STATES PATENT AND TRADEMARK OFFICE
CERTIFICATE OF CORRECTION

PATENT NO. : 4,762,221
DATED : August 9, 1988
INVENTOR(S) : Kunio Hashimoto, Haruo Okazaki It is certified that error appears in the above—identified patent and that said Letters Patent is hereby corrected as shown below:

Column 4, line 14, change "first" to --forward--.

Column 4, line 15, after "plane", insert --in--.

Signed and Sealed this

Twenty-fourth Day of January, 1989

Attest:

DONALD J. QUIGG

*Attesting Officer*     *Commissioner of Patents and Trademarks*